United States Patent
Hiermaier et al.

(10) Patent No.: US 11,906,292 B2
(45) Date of Patent: Feb. 20, 2024

(54) METHOD AND COMPUTER PROGRAM FOR TIME-RESOLVED CALCULATION OF A DEFORMATION OF A BODY

(71) Applicant: Fraunhofer-Gesellschaft zur Förderung der Angewand, Munich (DE)

(72) Inventors: Stefan Hiermaier, Freiburg (DE); Randolf Hanke, Fuerth (DE); Siegfried Nau, Freiburg (DE); Stefan Moser, Freiburg (DE); Norman Uhlmann, Fuerth (DE); Jens Fritsch, Freiburg (DE); Malte Kurfiss, Freiburg (DE); Rolf Behrend, Fuerth (DE); Ines Butz, Freiburg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 304 days.

(21) Appl. No.: 17/594,331

(22) PCT Filed: Apr. 8, 2020

(86) PCT No.: PCT/EP2020/060096
§ 371 (c)(1),
(2) Date: Oct. 12, 2021

(87) PCT Pub. No.: WO2020/208111
PCT Pub. Date: Oct. 15, 2020

(65) Prior Publication Data
US 2022/0196397 A1     Jun. 23, 2022

(30) Foreign Application Priority Data
Apr. 12, 2019   (DE) .......................... 102019109789.4

(51) Int. Cl.
G01B 15/06    (2006.01)
G01M 17/007   (2006.01)
G06T 7/00     (2017.01)

(52) U.S. Cl.
CPC ......... *G01B 15/06* (2013.01); *G01M 17/0078* (2013.01); *G06T 7/0004* (2013.01); *G06T 2207/10128* (2013.01)

(58) Field of Classification Search
None
See application file for complete search history.

(56) References Cited

U.S. PATENT DOCUMENTS

| 4,137,454 | A | 1/1979 | Brandon, Jr. |
| 4,354,112 | A | 10/1982 | Nishio |

(Continued)

FOREIGN PATENT DOCUMENTS

| DE | 102005027252 A1 | 12/2006 |
| DE | 102007047810 A1 | 5/2009 |

(Continued)

OTHER PUBLICATIONS

V. Crupi et al.: "Prediction model for the impact response of glass fibre reinforced aluminium foam sandwiches", International Journal of Impact Engineering 77 (2015), available online Nov. 20, 2014, pp. 97-107.

(Continued)

*Primary Examiner* — Hoon K Song
(74) *Attorney, Agent, or Firm* — 2SPL Patent Attorneys PartG mbB; Kieran O'Leary

(57) ABSTRACT

An example of a method for time-resolved calculation of a deformation of a body comprises calculating (110) a model of the body during the deformation. The method further comprises calculating (120) a predicted X-ray image for the body for a plurality of time points during the deformation (Continued)

based on the model. The method further comprises obtaining (130) one measured X-ray image of the body each for the time points during the deformation. The method further comprises modifying (140) the model based on the predicted X-ray images and the measured X-ray images.

14 Claims, 4 Drawing Sheets

(56) References Cited

U.S. PATENT DOCUMENTS

| | | | |
|---|---|---|---|
| 6,115,452 | A | 9/2000 | Marrs |
| 7,873,403 | B2 | 1/2011 | Lachner et al. |
| 7,957,505 | B1 | 6/2011 | Katz et al. |
| 9,105,087 | B2 | 8/2015 | Wang et al. |
| 10,987,169 | B2 * | 4/2021 | Turner .................. A61B 34/10 |
| 2014/0323845 | A1 * | 10/2014 | Forsberg .................. G06T 7/60 600/407 |
| 2016/0012592 | A1 | 1/2016 | Chou et al. |
| 2017/0024634 | A1 | 1/2017 | Miao et al. |
| 2019/0133693 | A1 | 5/2019 | Mahfouz |
| 2023/0088477 | A1 * | 3/2023 | Roussouly ............. A61B 34/10 |

FOREIGN PATENT DOCUMENTS

| | | |
|---|---|---|
| WO | 2017172641 A1 | 10/2017 |
| WO | 2018236936 A1 | 12/2018 |

OTHER PUBLICATIONS

E.H. Jordan et al.: "Microradiographic Strain Measurement Using Markers", Experimenat Lechanics, Springer New York LLC, US, vol. 34, No. 2, Jun. 1, 1994, pp. 155-165.

Angela W.C. Lee et al.: "Breast lesion co-localisation between X-ray and MR images using finite element modelling", Medical Image Analysis 17 (2013), available online Jun. 17, 2013, pp. 1256-1264.

A.M. Zolfaghari et al.: "High speed x-ray radiography diagnostics of current interruption in circuit breakers", Review of Scientific Instruments 73, 1945 (2002), published online Mar. 27, 2002, pp. 1945-1948.

Bahram Marami et al.: "Non-rigid registration of medical images based on estimation of deformation states", Institute of Physics and Engineering in Medicine, Phys. Med. Biol. 59 (2014), pp. 6891-6921.

* cited by examiner

METHOD AND COMPUTER PROGRAM FOR TIME-RESOLVED CALCULATION OF A DEFORMATION OF A BODY

CROSS-REFERENCE TO RELATED APPLICATIONS

This application is a 35 U.S.C. § 371(c) national stage entry of PCT/EP2020/060096, filed on Apr. 8, 2020. That application claimed priority to German Application 10 2019 109 789.4 filed on Apr. 12, 2019. The contents of the earlier filed applications are incorporated by reference herein in their entirety.

TECHNICAL FIELD

Embodiments relate to a method for time-resolved calculation of a deformation of a body and with a corresponding computer program, as well as with a system for producing a plurality of X-ray images.

BACKGROUND

When new vehicle models/generations are introduced, several representative crash tests are carried out both as part of type approval procedures and by independent, consumer protection-oriented test service providers (e.g., NCAP, New Car Assessment Program) to assess passive vehicle safety. The acceptance tests carried out are the decisive prerequisite for the approval and market launch as well as for the acceptance of new vehicles.

These overall vehicle crash tests are preceded by extensive experimental investigations of all relevant materials, individual components and component groups, which are carried out along the entire development process. This process is significantly supported by accompanying computer simulations, which allow predictions to be made about the behavior of a virtual component under mechanical load. The vehicle behavior during a crash and consequently its evaluation is exclusively defined by the design of energy absorbing structures of the vehicle. Consequently, a precise understanding of the material and component behavior in the extreme load case "crash" is the basis of virtual vehicle development. Despite the enormous importance of predictive models, there are significant differences between numerical simulation and physical experiment in the course of integrated design. The reason for this is the limited metrological access to safety-critical structures that are hidden inside the vehicle—a dynamic, imaging in-situ investigation is usually not possible in these cases.

In order to obtain as much information as possible about the deformations and movements of components during each individual crash, optical high-speed cameras, accelerometers and strain gauges are currently being used. Strain gauges or accelerometers continuously measure the load locally at the point of application. They must be laboriously wired and connected to external data recording devices, which limits the usable number per crash test. The available sensor technology therefore offers no (optical) or only punctual possibilities (local sensors) to observe hidden components in-situ in detail. With the help of complex 3D-DIC (Digital Image Correlation) methods, externally observable deformation processes during a crash can already be recorded and digitized. However, this evaluation method does not allow for a dynamic, in-situ imaging examination of internal structures.

This form of in-situ measurement method is extended by a-posteriori examinations of the deformed vehicle structures. Although valuable information about the final state can be obtained by mechanical disassembly, during which, however, residual stresses are lost, or with the aid of XXL computed tomography, it is not possible to draw conclusions about the dynamics of the actual deformation process with this method.

This poses the task of providing an analysis method that also enables an analysis of internal components.

SUMMARY

The invention is based on the understanding that a plurality of X-ray images of bodies being in the process of deformation may be obtained, such as by using a plurality of X-ray flashes or by using a pulsed X-ray source, such as a linear accelerator. If X-ray pulses are generated in this way, X-ray images of them may be recorded by using an area detector with suitable spatial and temporal resolution, for example by filming a suitable scintillator through a high-speed camera. In this case, the X-ray pulses may have a sufficiently small distance and/or a sufficiently short duration to avoid motion blur. This plurality of X-ray images may now be used to retrace a deformation of a body. For this purpose, a deformation model of the body is calculated, i.e., a model that maps how the body is expected to move and deform. Based on this, a representation of the body on X-ray images is predicted by relating the body, the X-ray source and the scintillator in a simulation. This predicted x-ray image is compared to an x-ray image actually taken, discrepancies are determined and used to modify the model. Then the modified model is used to predict the next X-ray image, which in turn is compared to the next X-ray image actually measured. Over a plurality of time points, a plurality of predicted X-ray images is thus compared with a plurality of measured X-ray images, and thus the model of the deformation is gradually aligned with the actual deformation. Therefore, after the method has been carried out, a model of the actual deformation of the body is available, which can be used to identify weak points of the body.

The developed measurement system and evaluation method addresses questions and technical problems which are not accessible for imaging or other metrological methods available so far. This allows for potentials to be tapped through an improved design of components with reduced safety margins for the same technical performance. This also comprises stability and branching problems in load-bearing structures inside the vehicle, as well as movement of dummies and their surrounding interior structures concealed by multiple airbags.

At least some embodiments thereby achieve a spatial resolution of less than one mm, and a(n) (extrapolated) temporal resolution of 1,000 frames per second. In order to achieve sufficient level of detail and material separation for complex structures such as the components installed in vehicles, a radiation source with an energy of up to 9 MeV is used in the developed system. This requires extensive precautions in terms of construction and personnel in radiation protection.

Experiments have demonstrated for the first time the suitability of X-ray imaging technology for analyzing the dynamic processes that take place during a crash: Using the X-ray flash technique (at 450 keV), up to four chronologically successive images were obtained during a crash test. The number of images is limited by the available X-ray flash source, which in principle allows a maximum of eight images from one viewing angle. Alternatively, however, other X-ray sources may be used, such as pulsed linear accelerators.

Embodiments thus create a method for time-resolved calculation of a deformation of a body. In this application, the deformation of a body comprises changing a shape of the body or a shape of a part of the body, such as by changing the outer and possibly inner contours of a body, and, optionally, also comprises a translation and/or a rotation of the body with respect to an origin and/or pivot point, such as in the form of a "shape-preserving deformation". For example, the deformation may be volume-preserving. In other words, in at least some embodiments, in addition to the change in shape, the term deformation also comprises "shape-preserving deformation", i.e., translation and rotation. The method comprises calculating a model of the body during the deformation. The method further comprises calculating a predicted X-ray image for the body for a plurality of time points during the deformation based on the model. The method further comprises obtaining one measured X-ray image of the body each for the time points during the deformation. The method further comprises modifying the model based on the predicted X-ray images and the measured X-ray images. This feature may also be referred to as "data assimilation", i.e., the model is adjusted, i.e., assimilated, based on the measured X-ray images. This method solves the problem according to the invention.

In at least some embodiments, a plurality of predicted X-ray images and a plurality of measured X-ray images from different perspectives may be used is for each time point of the plurality of time points. This allows for a more accurate adaptation of the model, as important points of the model may be tracked from different perspectives using features on the predicted and measured X-ray images.

For example, the model of the body during deformation may be calculated based on a predicted force application to the body during the deformation. The anticipated force application may be used as a parameter of a simulation of the model. In a FE simulation, a force application is that which deforms the body. If the body is deformed in such a way that the 3D displacements determined in the data assimilation are fulfilled by the deformed body, the use of artificial constraining forces is one of the ways to physically achieve and/or virtually induce this deformation, at least approximately. At the same time, the derivation of a "constraining energy", i.e., this constraining force the distance by which the body is deformed, may serve as a quantitative measure of the deviation between the experiment, i.e., the measured X-ray images, (and/or the shape that the body should have according to the result of the analysis) and simulation, i.e., the model. In other words, if the body or a part of the body is rotated by a certain angle (a shape-preserving deformation), a relatively small force may usually be required for this, and the energy used for this is small. When the body or part of the body is compressed, the force required for this may be very high. The energy required for this is very large in comparison. Thus, the variant of rotation—if it can be brought into agreement with the measured images—is to be preferred, because it has lower "costs". Both are ways to calculate the deformation of a body by simulation. The application of force is an essential parameter here. Other metrics may also be used, but there are advantages to looking at (constraining) forces.

In at least some embodiments, calculating the predicted X-ray image comprises a modification of the model which is based on an X-ray image of a previous or subsequent time point. For example, the analysis may be performed after the end of the experiment, where all the time steps of the simulation as well as X-ray images acquired at all predetermined time points during the experiment are available. Thus, the direction along the time line in which the analysis is performed may be freely selected. In some embodiments, the plurality of time points may be stepped through backwards (i.e., starting from the most recent), such as if a CT scan (computed tomography scan) of a crashed car is used as the starting value. Alternatively, the plurality of time points may be stepped through forwards (i.e., chronologically). Alternatively, all time points can be considered simultaneously, such as when using a smoothing method in the data assimilation.

In some cases, the model for a subsequent time point of the plurality of time points is calculated only when the modification of the model which is based on an X-ray image of the previous time point is performed. This allows for a gradual reduction in a difference between the predicted X-ray image and the measured X-ray image.

In embodiments, the model may be modified based on a difference between predicted positions of features on the predicted X-ray images and measured positions of corresponding features on the measured X-ray images. Here, the features may be used as reference points for the modification.

For example, at least some of the features may be formed by X-ray markers. X-ray markers may be applied, for example, to flat components of the body that are not readily identifiable due to their contour.

At least some of the features may be formed by contours of components of the body. This makes it possible to acquire the deformation of the body as far as possible without modifications (e.g., by markers) and thus to increase an accuracy of the analysis.

In this regard, the method may comprise, for example, calculating a translation and/or rotation of at least one part of the body caused by the deformation of the body based on the difference between the predicted and the measured positions of the features. The modification of the model may be based on the calculated translation and/or the calculated rotation of at least one part of the body. Using translations and rotations, a large part of the deformation may already be understood. A total of the displacements of all features, markers, etc. may be determined here in order to reduce the difference to the simulation by improving this translation and rotation of the 3D body in the first step and/or by changing the translation and rotation predicted by the simulation in such a way that the difference between the projected locations in the measured and predicted X-ray image is reduced. The differences that then remain and/or that cannot be resolved by translation and rotation may be reduced by deforming the body or a part of the body (for example, downstream to this step).

In some embodiments, the method further comprises calculating morphological operators for the deformation of the body based on the difference between the predicted and the measured positions of the features. The modification of the model may be based on the calculated morphological operators for the deformation of the body. Morphological operators may be used, for example, to image compressions or expansions of components of the body.

In this regard, morphological operators may be admitted that result from a linear combination of deformations calculated for previous or subsequent time points of the plurality of time points. For example, different linear combinations may be admitted for different features. This allows for a restriction of the search space in the calculation of the morphological operators.

In embodiments, the deformation of the body may be calculated by a numerical simulation based on a priori knowledge of the deformation and based on the calculated morphological operators. The a priori knowledge of the deformation and the calculated morphological operators may be used here to calculate constraining forces acting on the body, wherein the numerical simulation is based on the constraining forces. Alternatively, or additionally, the a priori knowledge and the calculated morphological operators may be used to adjust input parameters of the numerical simulation with respect to properties of a material of the body, with respect to acting forces, with respect to a geometry of the body, and/or with respect to velocities. Using numerical simulation, a higher accuracy of the model may be achieved.

For example, the method may comprise calculating a three-dimensional displacement vector for the features by geometrically back-projecting the features. The modification of the model may be based on the three-dimensional displacement vector. This allows for the modification of the model, as three-dimensional modifications are obtained there from two-dimensional observations.

In this regard, the modification of the model may be directed to reduce the difference between the predicted positions of the features on the predicted X-ray images and the measured positions of the corresponding features on the measured X-ray images over the plurality of time points. This allows for an increase in efficiency over the plurality of time points.

For example, the model of the body may be calculated in a finite element simulation. The finite element approach allows for the deformation of the body to be calculated.

Embodiments further create a program having a program code for executing the method when the program code is executed on a computer, a processor, a control module or a programmable hardware component.

In at least some embodiments, the method further comprises producing the measured X-ray images by capturing a scintillator with a high-speed optical camera. The measured X-ray images may be captured based on an exposure of the scintillator to a (pulsed or constant) radiation source. This makes it possible to produce X-ray images with a short time interval and without motion blur. Here, the motion blur is based, among other things, on the exposure time, which may be influenced either by the length of the X-ray pulses or by the length of the exposure time of the high-speed camera.

For example, the pulsed radiation source may be a linear accelerator. Such accelerator may be used, for example, to generate a larger number of X-ray pulses than an X-ray flash source.

BRIEF DESCRIPTION OF THE FIGURES

Some examples of devices and/or methods will be described in the following by way of example only and with reference to the accompanying figures, in which.

DESCRIPTION

Figure 1A:
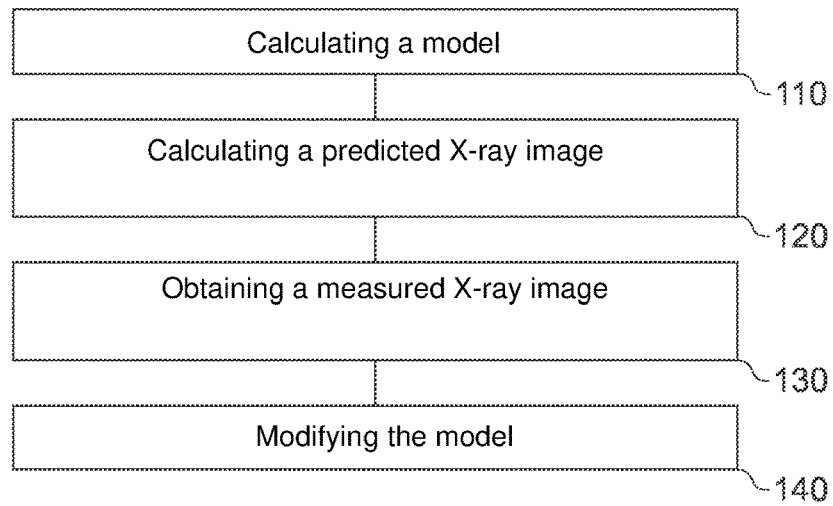
FIGS. 1a and 1b show embodiments of a method for time-resolved calculation of a deformation of a body.

Various examples will now be described more fully with reference to the accompanying figures in which some examples are illustrated. The thickness of lines, layers and/or areas in the figures may also be exaggerated for clarification.

Accordingly, while further examples are capable of various modifications and alternative forms, some particular examples thereof are shown in the figures and will subsequently be described in detail. However, this detailed description does not limit further examples to the particular forms described. Further embodiments may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e., only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality.

If a function is described below as implemented using multiple elements, further examples may implement the same function using a single element or a single processing entity. It will be further understood that the terms "comprises", "comprising", "includes" and/or "including," when used, specify the presence of the stated features, integers, steps, operations, processes, elements, components and/or any group of the same, but do not preclude the presence or addition of one or more other features, integers, steps, operations, processes, elements, components and/or any group thereof.

Unless otherwise defined, all terms (including technical and scientific terms) are used herein in their ordinary meaning of the art to which the examples belong.

The present disclosure describes an integral measurement and evaluation method, which, in addition to the examination of periodic processes, offers the possibility of continuously recording transient, dynamic (deformation) processes of hidden structures by means of in-situ high-speed X-ray diagnostics. Based on high-speed 2D X-ray imaging and incorporating 3D finite element (FE) simulations, or more generally a model of a body during the deformation, the method may, in at least some embodiments, enable quantitative reflection of experimental information back into the standard digital development environment.

The imaging measurement method is based, for example, on the use of pulsed X-ray radiation up to 9 MeV for single-image production in combination with a radiationresistant detector. Compared to normal typical industrial X-ray applications with low frame rates, a (for typical X-ray applications extremely) high frame rate of up to 1,000 frames per second may be used for the crash test in order to display the relevant deformation processes during the crash with sufficient temporal resolution. In order to reduce motion blur in the imaging of fast movements, the exposure times may be reduced to a range of microseconds in addition to a high frame rate. The exposure time may be implemented in the intended application by the pulsed X-ray source (approximately with a pulse length of about 4 µs).

The area detector used in the measurement method comprises (or consists of) a scintillator area located in the primary beam, which is adjusted to the high energies and short exposure times of the linear accelerator with regard to its (radiation) absorption properties, decay period, material thickness and properties. The scintillator area converts radiation into visible light, which is indirectly imaged and recorded by a high-speed camera (i.e., so-called digital indirect converting detector). The imaging optics are selected to minimize radiation exposure to the high-speed camera. In order to dynamically image larger objects (e.g., structural components of a vehicle), the active detector area may be increased by means of a modular setup, for example comprising individual modules cascading on three sides.

As a result of the measurement method, time-resolved, experimental data of a dynamic (deformation) process is available in the form of an "X-ray video" based on individual images at exactly determined time points, which, together with 3D FE simulation data of the observed process or of parts of the observed process form the basis for the evaluation method. For example, the x-ray video may comprise a plurality of x-ray images over a plurality of time points.

Figure 1B:
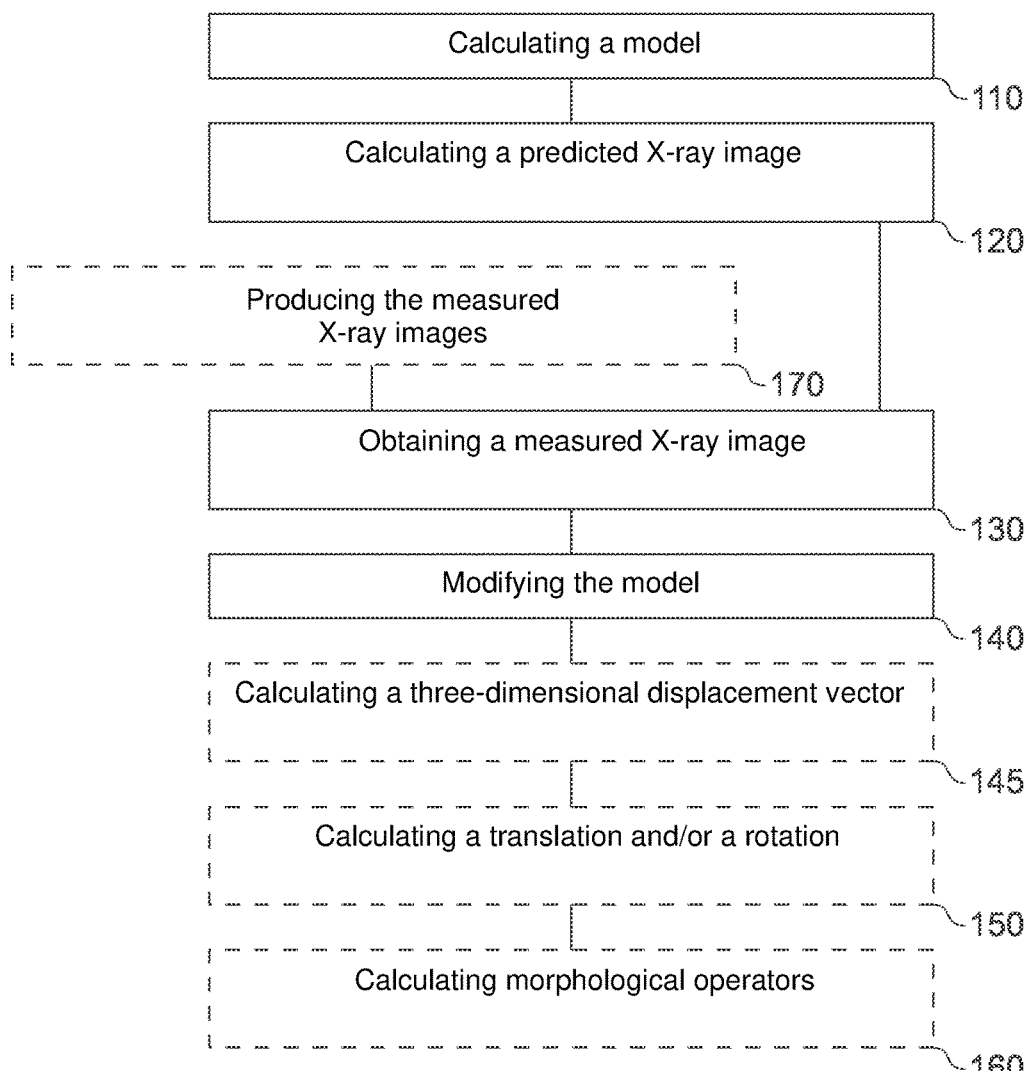

FIGS. 1a and 1b show embodiments of a method for time-resolved calculation of a deformation of a body. The method comprises calculating 110 a model of the body during the deformation, such as based on a predicted force application to the body during the deformation. For example, the body may be embedded in a plurality of other bodies and/or a complex model, such as that of a complete vehicle consisting of a plurality of bodies. In this context, the model of the body may be calculated 110 in a (3D-) finite element simulation. The method further comprises calculating 120 a predicted X-ray image for the body for a plurality of time points during the deformation based on the model, such as based on a predefined imaging geometry ("viewing angle"). Here, the deformation is, for example, a process comprising the (approximately all of the) plurality of time points, that is, a process of deformation of the body over the plurality of time points. Here, the deformation may comprise translation and rotation of the object (body) under consideration. During a translation or rotation, the relative position of features (or feature points) within the object remains the same, but the positions of the features change with respect to an external coordinate system. In embodiments, the deformation further comprises a deformation (in the classical sense), i.e., the relative position of (some of) the features changes relative to each other. The method further comprises obtaining 130 one measured X-ray image of the body each for the time points (or the plurality of time points) during the deformation. In this regard, a plurality of predicted X-ray images and a plurality of measured X-ray images from different perspectives may be used for each time point of the plurality of time points. The method further comprises modifying 140 the model based on the predicted X-ray images and the measured X-ray images. In this regard, as shown in FIG. 1b, the method may further comprise producing 170 the measured X-ray images by capturing a scintillator with a high-speed optical camera, for example, in order to obtain the measured X-ray images. The measured X-ray images may be captured based on an exposure of the scintillator by a pulsed radiation source.

For the evaluation of the obtained data, an X-ray simulation is produced from the existing (3D FE) simulation data, the model of the body during the deformation. Based on the X-ray simulation, the predicted X-ray images may be calculated. The X-ray simulation is part of the integrated data evaluation and data assimilation. By means of X-ray simulation (which may be used to calculate the predicted X-ray images) and the absorption properties imaged based on material data, the (theoretical) spatial position of relevant structures may be represented at each time step. In other words, the respective predicted X-ray image may be calculated based on a position of the components of the body, based on absorption properties of the components of the body, and based on a predicted viewing angle, such that, for each time point of the plurality of time points, a projected position of the components or of features is shown on the respective predicted X-ray image. In this context, the respective predicted X-ray image may, for example, depict (exclusively) the projected position of the features, for example without showing the shading or contours of the components. In this regard, a predicted X-ray image for a time point (in) the plurality of time points may be calculated in some embodiments only after the modification of the model based on a previous time point of the plurality of time points has been made, i.e., based on the modified model. With the help of adapted feature detection and tracking algorithms, the deformation of relevant structures may be tracked on the basis of information from the previous time step. In other words, the model may be modified 140 based on a difference between predicted positions of features on the predicted X-ray images and measured positions of corresponding features on the measured X-ray images. Here, features may be identified manually and/or automatically in the predicted X-ray images and the measured X-ray images. For example, at least some of the features may be formed by X-ray markers. These X-ray markers may be placed on the body and integrated into the model. Due to their previously known position on the body, the identification of these features may be done automatically (or also manually). Additionally, or alternatively, at least some of the features may be formed by contours of components of the body. Here, contours may be identified automatically or manually in the predicted X-ray images and the measured X-ray images, for example based on the material properties of the corresponding components. The merging of experimental and numerical simulation data, hereinafter data assimilation, consequently aims at a successive improvement of a self-contained, temporally resolved model with predictive capability.

On the one hand, there is a time-resolved, possibly error-prone (3D) FE simulation of a vehicle crash (the model of the body), and on the other hand, there is time-resolved experimental data (the measured X-ray images) which is, however, informationally under-constrained [unterbestimmt, German] (2D X-ray or sensor data). Matching experiment and model using data assimilation feeds correction information back into the (informationally fully-constrained [voll bestimmt, German]) FE model and thus enables the digitization of the real crash experiment.

Figure 4:
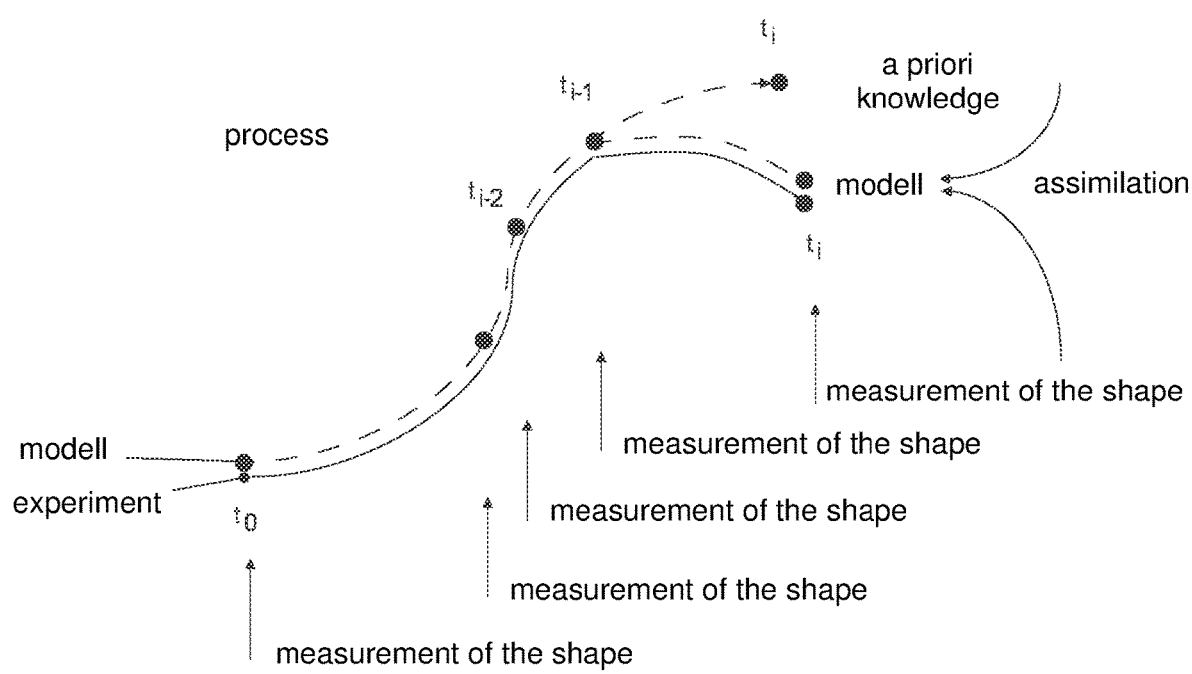
FIG. 4 shows an illustration of data assimilation to modify the model.

In particular, the model here may be a finite element model. The model contains the "whole truth" (phase space) of the process and/or the body and its temporal evolution. It comprises or consists of the geometry of the body (morphology) and physical parameters, such as materials and material properties, boundary conditions (velocities, forces, . . . ), internal properties (internal energy, stresses, strain, damage, . . . ). In this case, the model, at each time point t of the plurality of time points, represents an almost correct description of the experiment (i.e., of the deformation) up to the time point t−1 previously considered. Here, the model may be considered to be a finite element representation of the deformation (i.e., the experiment) at the time point t. At time point t, the model and the experiment (nearly) coincide with each other by means of the method of data assimilation (here, too, the entire phase space is meant). FIG. 4 shows an illustration of data assimilation to modify the model. There it is shown how different measurements of the shape of the body (by measured X-ray images) are carried out over the plurality of time points up to time point t, wherein the model up to time point t−1 was modified in each case so that it resembles the experiment (i.e., the real deformation of the body). Therefore, the a priori knowledge comprises the modified model up to the time point t−1, as well as the prediction of the deformation up to time point t. At time point t, the measurement of the shape diverges from the a priori knowledge, i.e., the prediction of the deformation. By assimilating the data, the model may be modified, starting from the A priori information, so that the model subsequently resembles the measured shape of the body.

One result of the data assimilation is the quantitative and time-resolved three-dimensional reconstruction of the motion (translation, i.e., center of gravity motion and rotation) as well as the deformation of objects (hereinafter referred to as "component"), if necessary embedded in an overall system consisting of several components.

This three-dimensional kinematic reconstruction is based on model knowledge (a-priori information) and measurement data (2D X-ray images). The 2D X-ray images may be obtained according to the source-detector setup described in the solution path.

The result of a numerical simulation (e.g., FEM simulation), which describes the behavior of the component to be examined (as well as the behavior of the surrounding components and/or the overall system consisting of several components), may be used as A-priori information, for example the model of the body during the deformation. In other words, the model of the previous time point (i.e., the model that was adjusted based on the X-ray simulation of the previous time point) comprises or is at least part of the A priori. In other words, the A priori information comprises, for example, the old, original (FE) model and/or the corrected model up to time point t−1 and the prediction of the state at time point t by the present model at time point t−1. Here, "during the deformation" does not mean that the model is calculated (only) during the deformation, but that the model of the body maps the deformation of the body over the plurality of time points. This result, which is used as a priori information for data assimilation, is hereinafter referred to as a "time-resolved 3D model", or "model (of the body)" for short. If in the following the numerical simulation or the physical model of the components and their materials on which the simulation is based is meant, this is referred to as "physical model" and/or the entirety is referred to as "numerical simulation". In embodiments, the calculation of the model of the body during the deformation comprises or is based on a numerical simulation. The numerical simulation is based on a physical model of the body, such as physical models of the components of the body.

The 3D reconstruction of the kinematics and/or data assimilation comprises at least some of the following acts:
1) Generate simulated X-ray projections (i.e., the predicted X-ray images) based on the model and using the projection geometry present in the experiment for each time point at which an image was generated in the experiment and the component to be reconstructed was imaged (i.e., for the plurality of time points). In other words, the method comprises calculating 120 a predicted X-ray image for the body for the plurality of time points during the deformation based on the model (such as based on the projection geometry, a predicted viewing angle in capturing the corresponding X-ray image).
2) Using the simulated X-ray projections to locate the component to be kinematically reconstructed (simultaneously or sequentially) in as many real X-ray images as possible generated at corresponding time points on which it was imaged, and/or using the X-ray projections simulated at the corresponding time points to locate salient points (features) of the component to be reconstructed in as many real X-ray images as possible on which it was imaged. For example, (only) the morphology (and/or a part of the morphology) at the points of measurement $t_i$ is accessible to the (X-ray) measurement
3) In other words, the method may comprise identifying and/or locating the features in the measured X-ray images based on the positions of the features in the predicted X-ray images.
4) Quantitative comparison of the position of contours of the total component and/or position of features in the simulated X-ray image (2D displacement vector) and from this derivation of a three-dimensional displacement vector in space by geometric back projection for each characteristic contour and/or feature point (i.e., for each feature) and for each time point at which, in the experiment, an image was acquired and the component to be reconstructed was imaged. In other words, the method may comprise calculating 145 a three-dimensional displacement vector for the features by geometrically back-projecting the features, such as for each feature over the plurality of time points. The modification of the model may be based on the three-dimensional displacement vector.
5) Reduction of the differences quantified in 3) and quantification of the residual difference (specification of a measure of quality) for all time steps and all features captured (in the model). This corresponds to modifying 140 the model based on the predicted X-ray images and the measured X-ray images. In other words, the modification 140 of the model may be directed to reduce the difference between the predicted positions of the features on the predicted X-ray images and the measured positions of the corresponding features on the measured X-ray images over the plurality of time points.

Here, the reduction of the differences may be achieved by various means.

For example, the reduction may be achieved by changing the center of gravity motion (translation) and (rigid body) rotation about the center of gravity of the component (of the body) to be reconstructed. The model of the component/body may be the (3D) model (i.e., the partial result of the numerical simulation for the component) available at the corresponding time step (or other time steps better suited to the current deformation state, regardless of whether they lie before or after that in time) of the numerical simulation. In other words, the method may comprise calculating 150 a translation and/or rotation of at least one part of the body caused by the deformation of the body based on the difference between the predicted and the measured positions of the features. The modification of the model may be based on the calculated translation and/or the calculated rotation of at least one part of the body. For example, a translation and/or rotation of the part of the body assumed in the model may be adjusted based on the translation and/or rotation caused by the deformation of the body, or the translation and/or rotation caused by the deformation of the body may be added to the model. In this regard, calculating 150 the translation and/or rotation caused by the deformation of the body may calculate the translation and/or rotation such that a difference between the predicted positions of the features on the predicted X-ray images and the measured positions of the corresponding features on the measured X-ray images is reduced (on correspondingly recalculated predicted X-ray images).

In addition, the object/body may be deformed using morphological operators. A morphological operator is a computational operation that transforms the shape (morphology) of the A priori information (i.e., the model) at time point t into the morphology of the measurement at time point t and/or reconciles it with the same. In other words, the morphological operator is a computational operation for matching the model to the reality depicted in the respective measured X-ray image, such as by adjusting the model in such a way that the predicted positions of the features match the measured positions of the corresponding features. In the simplest case, this is the application of displacement vectors (unphysical). In at least some embodiments, (in the complex case) this is a regulation based on physical parameters, as illustrated below. The method may further comprises calculating 160 morphological operators for the deformation of the body based on the difference between the predicted and the measured positions of the features. The modification of the model may be based on the calculated morphological operators for the deformation of the body. For example, morphological operators assumed in the model may be adjusted based on the calculated morphological operators, or the calculated morphological operators may be added to the model. In this regard, calculating 160 the morphological operators may calculate the morphological operators such that a difference between the predicted positions of the features on the predicted X-ray images and the measured positions of the corresponding features on the measured X-ray images is reduced (on correspondingly recalculated predicted X-ray images).

The morphological operators may be based on a displacement of salient points of the body in the model, where the salient points correspond to the features in the predicted and measured X-ray images. In some embodiments, the morphological operators may be calculated by shifting the salient points in the model based on the difference between the predicted and measured positions of the features and adjusting adjacent components/elements of the body proportionally and/or based on a mathematical function to the shifted salient points. Alternatively, the morphological operators may be calculated by inserting (un)physical constraining forces into the model based on the difference between the predicted and measured positions of the features, and by modifying the body based on the (un)physical constraining forces such that a difference between the predicted and the measured positions of the features is reduced. In a third variant, the morphological operators may be computed by shifting the salient points in the model based on the difference between the predicted and the measured positions of the features, the shifts resulting from linear combinations of shifts computed for previous and/or subsequent time points of the plurality of time points. It is assumed that the model is generally correct and only one time/phase or amplitude of the displacements is adjusted.

As already explained, the morphological operators for deformation may be restricted by admitting only deformations resulting from linear combination of the deformation of the 3D models (normalized with respect to rotation and translation) relative between other time points of the numerical simulation. In other words, (only/exclusively) morphological operators may be admitted, which result from a linear combination of deformations calculated for previous or subsequent (future) time points of the plurality of time points (in the numerical simulation) (e.g., in the modification of the model for one or more previous time points). For example, (all) information about the deformation of the body predicted by the FE simulation may be available at any time point of the simulation (even at later time points than the one just considered). For this reason, for this approach to explain the deformations and/or to apply them to the considered part, it is possible to consider also the deformation predicted at later time points. This may be used, for example, in cases where the simulation basically shows the correct deformation of a component of the body, but at a later time point than it occurs in reality. Then, the deformation in the current time step may be explained and/or mapped by "bringing forward" the deformation of a later time step.

In at least some embodiments, different linear combinations (i.e., different weighting of the relative deformation for the same time points) for different features may also be admitted for the same component. For example, different linear combinations may be admitted for different features. In this regard, the body may comprise one or more components, and each component may (in turn) comprise one or more of the features. Different linear combinations may be admitted for each of the features (including of the same component).

In at least some embodiments, the deformation of the component may be calculated by a numerical simulation that takes into account both a-priori physical information (e.g., material models of the body, forces acting on the body and velocities (such as in a crash scenario) of the previous time step) as well as the result of the previous calculations (morphological operators, translation, rotation, i.e., 3D displacement vectors) as boundary conditions for e.g. a quasistatic or dynamic deformation (e.g., due to non-physical constraining forces). For example, calculating the model may include or be based on the numerical simulation. The a priori knowledge of the deformation and the calculated morphological operators (and the translation/rotation of the components of the body) may be used to calculate constraining forces acting on the body. The numerical simulation may be based on the constraining forces. Here, the morphological operators and the translation and/or rotation of the components of the body may be summarized under the term of 3D displacement vectors. In other words, the deformation of the body may be calculated by a numerical simulation based on a priori knowledge of the deformation and based on the calculated morphological operators (in the calculation of the model of the body). Alternatively, the deformation of the component may be modified not by unphysical deformation vectors, constraining forces, or other boundary conditions, but by changing the input parameters (e.g., but not limited to, forces, velocities, and material parameters) of the numerical simulation in the previous time step and performing the time step or multiple time steps (over the plurality of time points) of the numerical simulation. In other words, the a priori knowledge and the calculated morphological operators may be used to adjust input parameters of the numerical simulation with respect to properties of a material of the body, with respect to acting forces, with respect to an input geometry of the body, and/or with respect to velocities.

The reduction in differences may be performed in such a way as to reduce the deviation between the projected position and shape of the component (and/or the features by which the component is defined) in the X-ray images obtained in the experiment and those obtained on the basis of the model modified by the aforementioned means.

6) In at least some embodiments, steps 1 to 4 may be repeated (for each predicted/measured X-ray image) using as a model the model modified in the last step, and/or the result of the FEM simulation modified in the last step. In other words, the calculating 120 of the predicted X-ray image may include a modification of the model based on a previous X-ray image or on a previous iteration of the steps. The model may, for example, for a subsequent time point of the plurality of time points be calculated 110 only when the modification of the model which is based on an X-ray image of the previous time point is performed. This allows the inclusion of the previously calculated modifications made to the model.

7) The method can be aborted/terminated if no further improvement can be achieved in step 4, i.e., the iterative method has reached the solutions with the reduced (approximately minimum) deviation.

Depending on the embodiment, the result comprises a time-resolved 3D representation (model) of the performed experiment (such as the model of the body during the deformation, over the plurality of time points), where the position and orientation of one or more components in space at each time point at which an image was generated in the experiment and the component was imaged, was corrected in the model to match the position and orientation in the experiment, taking into account the errors of experiment and simulation. In this regard, depending on the embodiment, one or more components of the body may be deformed, for example, if the morphological operators have been calculated.

Figure 2:
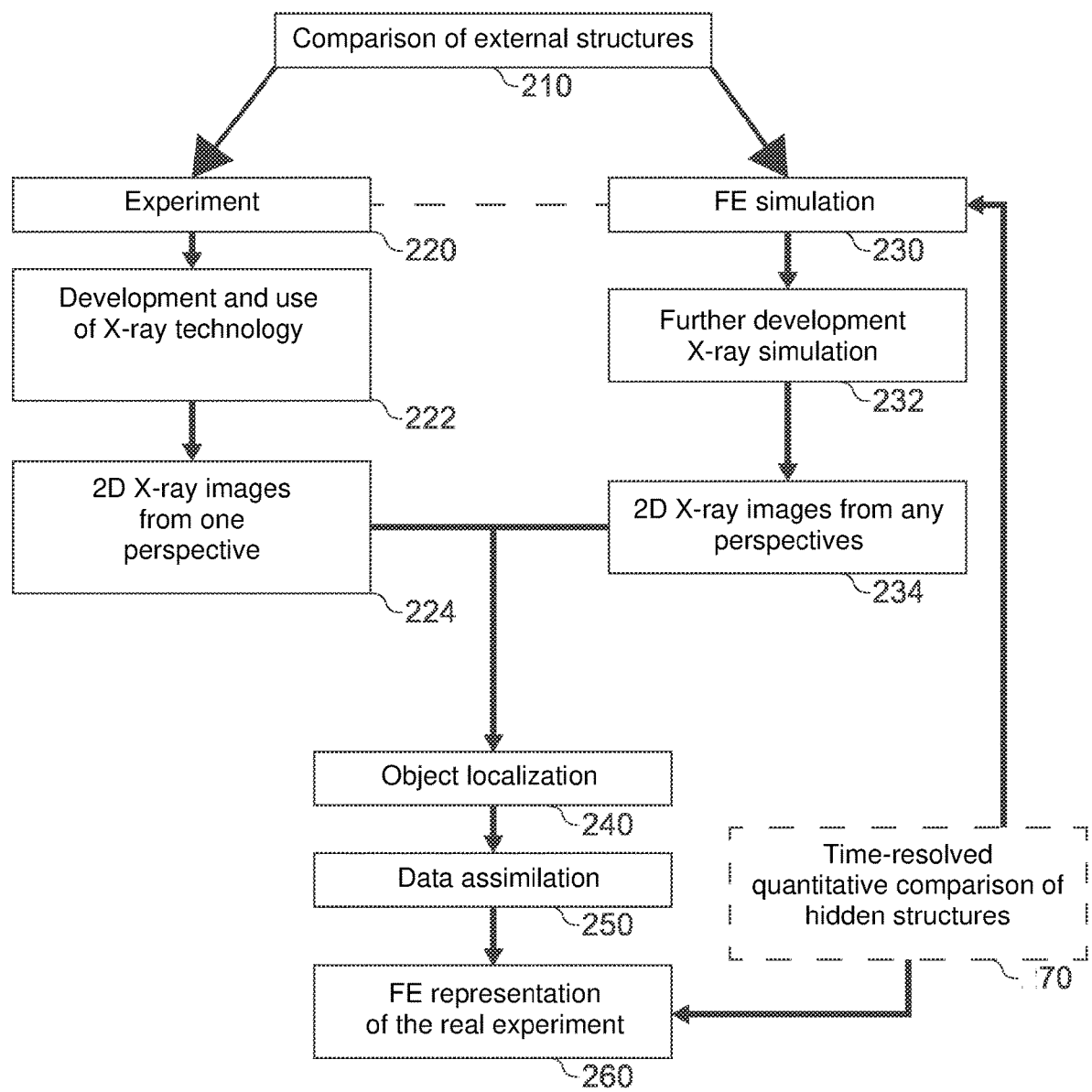
FIG. 2 shows an overview of a measurement and evaluation method according to an embodiment.

FIG. 2 shows an overview of a measurement and evaluation method according to an embodiment. In FIG. 2, a comparison of external structures 210 is performed based on an experiment 220 and an FE simulation 230. To record the experiment, X-ray technology is developed and used 222 to measure and obtain 224 2D X-ray images from a perspective. An X-ray simulation 232 is derived from the FE simulation 230, by means of which predicted X-ray images 234 are calculated over a plurality of time points. Based on the measured and the predicted X-ray images, an object localization 240 is performed to identify features of a body to be examined, and a data assimilation 250 takes place (such as by modifying the model based on the measured and the predicted X-ray images). Based on the data assimilation, a FE representation (such as the model of the body during the deformation) of the real experiment is generated 260. In other words, the measurement and evaluation method implements a time-resolved quantitative comparison of hidden structures that feeds into the FE representation of the real experiment 260 and into the FE simulation 230.

In addition to examinations of periodic processes, the developed measurement system of in-situ high-speed X-ray diagnostics offers for the first time the possibility to continuously record and evaluate transient, dynamic processes of hidden structures. With regard to the automotive crash, the visualization of highly dynamic deformation processes during a crash test provides clues and answers to fundamental questions in the development process that were not previously available, as, for the first time, it is possible to observe components installed in the vehicle interior during the crash in a real test scenario.

In-situ X-ray diagnostics, previously unattainable, became possible by integrating 2D imaging X-ray experiments with 3D structural data from the numerical simulation. Based on the frame rate of up to 1000 frames per second, X-ray videos of dynamic processes may also be produced. Furthermore, the newly developed analysis method opens up possibilities in the integration of experimental and computer-based analyses. Experimental results may be used for the direct comparison with numerical prognoses and contribute to significantly improve the predictive power of the simulation calculations.

Embodiments may be used, for example, to make door closing mechanisms visible during a side impact during the crash. As in many other conceivable applications, the motivation for using X-rays in this case lies in the crash to visualize otherwise unobservable structural deformations. In order to keep the passengers safely inside the vehicle in the event of an accident, it is imperative that door opening is avoided in the event of a crash. Should it become apparent at a development stage that a door opening will occur in the event of a side impact, it is common practice to apply elaborate measurement technology at many points inside the lock. By examining the mechanisms with X-ray technology, it is possible to examine a large internal area by only one additional analysis in order to comprehend causes in detail and in full. The pending development work may then be started immediately in the right place. This may be used to support the current major changes in vehicle concepts from electromobility to autonomous driving. Analytical methods such as X-ray technology may be seen here as pacemakers for innovative concepts with high crash safety.

Different deviating combinations of radiation source/detector assembly or properties are possible here for the measurement method. With regard to the evaluation method, other process steps are conceivable in order to feed back correction information into the virtual (FE) model from the comparison of experiment and model by means of data assimilation.

Embodiments create a dynamic deformation analysis of (hidden) structures using X-rays. Embodiments further create a match of experimental data with a time-resolved (virtual) 3D model. Embodiments further create a feedback of correction information using the described process.

The use of dynamic X-ray diagnostics in automotive crash testing is to be seen as only one exemplary application. For example, embodiments may be used to address selected issues in individual crash tests. Here, the execution and instrumentation of a crash test may be improved in advance by means of X-ray simulation and, if necessary, may also equipped with dynamic X-ray technology. For example, X-ray may be used as a standard tool at relevant points in the development process, from an early concept study through to release or certification, flexibly and efficiently in trial operation. In order to achieve shorter development times with increased complexity in this context, the direct connection of the new diagnostics to the digital development environment is possible. In addition to other obvious applications in dynamic deformation analysis outside the automotive industry, e.g., for the aviation or packaging industry, periodic processes may also be examined and understood much better, for example in the context of service life considerations. As both the overall system and individual system components, from the source to the detector up to the evaluation methodology, go far beyond other approaches, there are further applications of the technology as well as new diverse possibilities in the analysis of bodies, such as deformations of bodies:

In-Situ Implant Control

At least some embodiments may be used in an application of dynamic X-rays in the observation of implant components during the mastication process. Micro-deformations in the connection points of the implant components may lead to the undesired penetration of germs or to the failure of the implant structure. The dynamic X-ray diagnostics makes these deformations and the critical structural areas visible, thus enabling alternative and more reliable implant designs.

Application in Cargo Screening

In security technology, imaging X-ray techniques are often used for baggage or cargo screening at airports, ports or borders to detect illicit goods, weapons or drugs. Line detector-based devices currently do not provide the required throughput due to long scan and evaluation times. This applies in particular to air and sea freight. For efficient air cargo screening by means of CT (computed tomography), large-area, fast high-energy area detectors, such as those being developed in the dynamic X-ray diagnostic system, appear to be particularly well suited. Thus, the technologies developed in this project offer the prospect of establishing CT as the standard in air cargo screening in the future.

Expansion of Diagnostics for Materials Research

Two trends in materials research are the cross-scale examination of materials from the atomistic to the macroscopic level and the integration of experiment and numerical simulation. Both serve to better understand the observed material behavior and both areas benefit directly from the use of dynamic X-ray diagnostics. The algorithms of digital deformation analysis developed in evaluation methods open up the possibility of analyzing complex multi-material samples with a significantly higher information yield than with previously available methods. They may be used in both dynamic and quasi-static cases. This allows a detailed characterization of the material behavior over several length and time scales. For designers as well as for simulation experts this development is of utmost importance.

Use in Conveying Equipment and Process Engineering

The imaging analysis of dynamic processes offers promising application possibilities in process engineering. In the food industry, for example, substances with in part different phases (liquid-liquid, solid-liquid, solid-solid) may be processed together. The precise understanding of the underlying mixing processes may provide decisive added value, especially for the quality and shelf life of food. In addition, current questions regarding the transport mechanisms of granular substances may be addressed.

More details and aspects of the method are mentioned in connection with the concept or examples described above (e.g., FIGS. 1a and 1b). The method may comprise one or more additional optional features corresponding to one or more aspects of the proposed concept or of the described examples as described above or below.

Figure 3:
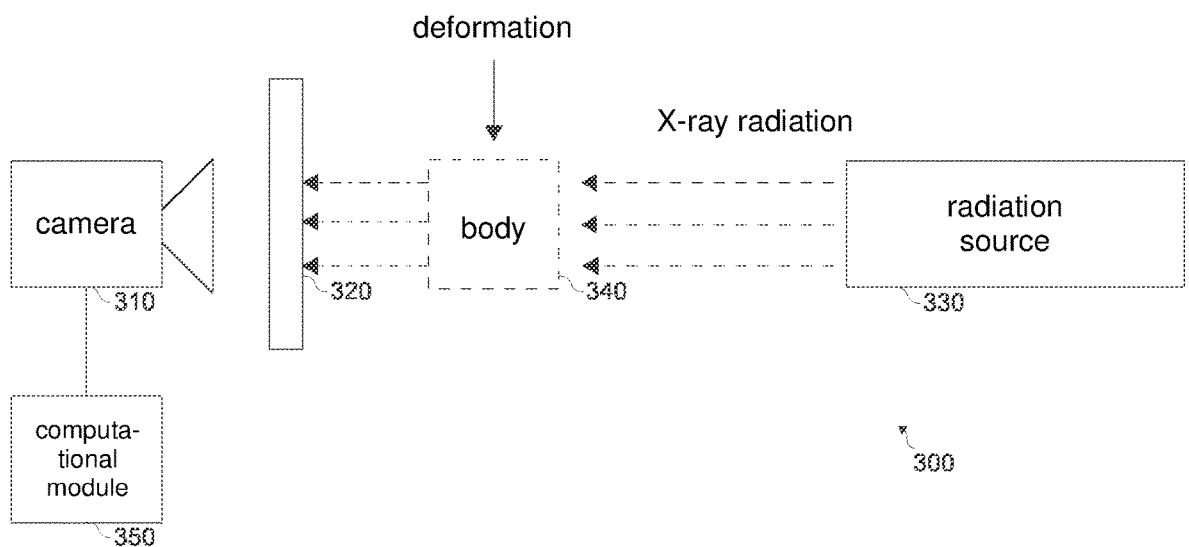
FIG. 3 shows an embodiment of a setup of a system for producing a plurality of X-ray images.

FIG. 3 shows an embodiment of a setup of a system 300 for producing a plurality of measured X-ray images. In some embodiments, the system may be further suitable for time-resolved calculation of a deformation of a body. The system comprises at least one high-speed optical camera 310, a scintillator 320, and a radiation source 330. For example, the radiation source may be configured to expose a scintillator area of the scintillator to pulsed X-ray radiation. Alternatively, the radiation source may be a radiation source that constantly emits radiation in the direction of the scintillator. In this regard, a body 340, such as the body introduced in connection with FIGS. 1a to 2 may be arranged between the radiation source 330 and the scintillator 320. The scintillator 320 is configured to emit the radiation emitted from the radiation source in the form of light. Here, the scintillator area may be configured to convert radiation of the radiation source into visible light, which is indirectly imaged and recorded by the high-speed camera (i.e., so-called digital indirect converting detector). The high-speed optical camera 330 is configured to capture the light emitted/converted by the scintillator 320. An imaging optics of the high-speed camera may be selected such that the radiation exposure to the high-speed camera is reduced. For example, the system may be configured to produce 170 the measured x-ray images. In this regard, the pulsed radiation source may be a linear accelerator. For example, the radiation source 330 may be configured to emit X-ray radiation with a suitably short pulse length to avoid motion blur. Alternatively, as discussed above, a constant radiation source may be used, and an exposure time of the high-speed camera may be adjusted to avoid motion blur. The motion blur in the X-ray image is a function of the resolution of the X-ray image, the imaging scale, and the speed of the object over the exposure time. In general, the exposure time may be adjusted by using a pulsed radiation source over the length of the emitted pulses and/or by an exposure time (related to the frame rate of the camera) of the high-speed optical camera (such as in the case of a constant radiation source). Here, the capture of the X-ray images is a function of the pulse width of the X-ray pulses (in the case of a pulsed radiation source), the frame rate/exposure time of the high-speed camera, and the energy of the X-ray source. The X-ray radiation may be selected sufficiently high to still be able to penetrate the components to be imaged (at the selected exposure time).

The high-speed optical camera may be configured to capture light in the visible wavelength range. For example, the high-speed optical camera may be configured to capture a frame rate of at least 100 (X-ray) frames/s (or at least 200 frames/s, at least 500 frames/s, at least 800 frames/s). The scintillator area is adapted to the high energies and short exposure times of the pulsed X-ray radiation with respect to its (radiation) absorption properties, decay time, material thickness and properties.

In order to dynamically image larger objects (e.g., structural components of a vehicle), the active detector area may be increased by means of a modular setup, for example comprising individual modules cascading on three sides. For example, the scintillator may comprise a plurality of scintillator modules, and the system may comprise a plurality of high-speed cameras for capturing the emitted/converted light of the plurality of scintillator modules. For example, the plurality of scintillator modules may be arranged in a matrix configuration, such as a 1×n, 2×n, or m×n matrix configuration. For example, each scintillator module may be adjacent to up to three other scintillator modules (and therefore be triple cascaded), up to four other scintillator modules (quadruple cascaded, such as in an m×n matrix), or up to six other scintillator modules (in a hexagon-based honeycomb arrangement).

In some embodiments, the system 300 further comprises a computational module 350 configured to perform the method of FIGS. 1a and/or 1b.

More details and aspects of the system are mentioned in connection with the concept or examples described above (e.g., FIGS. 1a to 2). The system may comprise one or more additional optional features corresponding to one or more aspects of the proposed concept or of the described examples as described above or below.

The aspects and features described together with one or more of the previously detailed examples and figures may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Acts, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and figures merely illustrate the principles of the disclosure. Furthermore, all examples recited herein are principally intended expressly to be only for illustrative purposes to aid the reader in understanding the principles of the disclosure and the concepts contributed by the inventor (s) to furthering the art. All statements herein reciting principles, aspects, and examples of the disclosure, as well as specific examples thereof, include equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the Figures, including any functional blocks labeled as "means", "means for providing a signal", "means for generating a signal", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, a network processor, an application specific integrated circuit (ASIC), a field programmable gate array (FPGA), read only memory (ROM) for storing software, random access memory (RAM), and non-volatile storage. Other hardware, conventional and/or custom, may also be comprised.

A block diagram may, for instance, illustrate a rough circuit diagram implementing the principles of the disclosure. Similarly, a flow chart, a flow diagram, a state transition diagram, a pseudo code, and the like may represent various processes, operations or acts, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and be part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to also include features of a claim to any other independent claim even if this claim is not directly made dependent to the independent claim.

The invention claimed is:

1. A method for time-resolved calculation of a deformation of a body, the method comprising:
   calculating a model of the body during the deformation, wherein the model of the body during the deformation is calculated based on an expected force application to the body during the deformation, wherein the deformation of the body is calculated by a numerical simulation based on a priori knowledge about the deformation and based on calculated morphological operators;
   calculating a predicted X-ray image for the body for a plurality of time points during the deformation based on the model;
   obtaining one measured X-ray image of the body each for the time points during the deformation;
   modifying the model based on the predicted X-ray images and the measured X-ray images,
   wherein the model is modified based on a difference between predicted positions of features on the predicted X-ray images and measured positions of corresponding features on the measured X-ray images, the modification of the model being directed to reduce the difference between the predicted positions of the features on the predicted X-ray images and the measured positions of the corresponding features on the measured X-ray images over the plurality of time points; and
   calculating the morphological operators for the deformation of the body based on the difference between the predicted and the measured positions of the features, wherein the modification of the model is based on the calculated morphological operators for the deformation of the body, wherein the a priori knowledge and the calculated morphological operators are used to adjust input parameters of the numerical simulation with respect to properties of a material of the body, with respect to acting forces, with respect to a geometry of the body, and/or with respect to velocities.

2. The method of claim 1, wherein calculating the predicted X-ray image comprises a modification of the model which is based on an X-ray image of a previous or subsequent time point.

3. The method of claim 2, wherein the model for a subsequent time point of the plurality of time points is calculated only when the modification of the model which is based on an X-ray image of the previous time point is performed.

4. The method of claim 1, wherein at least some of the features are formed by X-ray markers.

5. The method of claim 1, wherein at least some of the features are formed by contours of components of the body.

6. The method of claim 1, further comprising calculating a translation and/or rotation of at least one part of the body caused by the deformation of the body based on the difference between the predicted and the measured positions of the features, wherein the modification of the model is based on the calculated translation and/or the calculated rotation of at least one part of the body.

7. The method of claim 1, wherein morphological operators are admitted that result from a linear combination of deformations calculated for previous or subsequent time points of the plurality of time points.

8. The method of claim 7, wherein different linear combinations are admitted for different features.

9. The method of claim 1, wherein the a priori knowledge of the deformation and the calculated morphological operators are used to calculate constraining forces acting on the body, wherein the numerical simulation is based on the constraining forces.

10. The method of claim 1, wherein the method comprises calculating a three-dimensional displacement vector for the features by geometrically backprojecting the features, wherein the modification of the model is based on the three-dimensional displacement vector.

11. The method of claim 1, wherein, for each time point of the plurality of time points, a plurality of predicted X-ray images and a plurality of measured X-ray images from different perspectives are used.

12. The method of claim 1, further comprising producing the measured X-ray images by capturing a scintillator with a high-speed optical camera, wherein the measured X-ray images were captured based on an exposure of the scintillator by a pulsed radiation source.

13. The method of claim 12, wherein the pulsed radiation source is a linear accelerator.

14. A non-transitory, computer readable medium having a program code for executing the method of claim 1, when the program code is executed on a computer, a processor, a control module or a programmable hardware component.

* * * * *